United States Patent
Smith et al.

(10) Patent No.: US 9,557,968 B1
(45) Date of Patent: Jan. 31, 2017

(54) COMPARISON GRAPH

(71) Applicant: GitHub, Inc., San Francisco, CA (US)

(72) Inventors: Stephen Smith, Mishawaka, IN (US);
Danny Greg, San Francisco, CA (US);
Karl Tobias Ahlin, Molndal (SE)

(73) Assignee: GitHub, Inc., San Francisco, CA (US)

( * ) Notice: Subject to any disclaimer, the term of this patent is extended or adjusted under 35 U.S.C. 154(b) by 0 days.

(21) Appl. No.: 14/581,937

(22) Filed: Dec. 23, 2014

(51) Int. Cl.
*G06F 9/44* (2006.01)

(52) U.S. Cl.
CPC .. *G06F 8/34* (2013.01); *G06F 8/75* (2013.01)

(58) Field of Classification Search
None
See application file for complete search history.

(56) References Cited

U.S. PATENT DOCUMENTS

| | | | |
|---|---|---|---|
| 2009/0083102 A1* | 3/2009 | Wall | G06Q 10/06311 705/7.15 |
| 2014/0297592 A1* | 10/2014 | Ohtake et al. | 707/638 |

OTHER PUBLICATIONS

Stack Overflow, "How do I see the commit differences between branches in git?", http://stackoverflow.com/questions/13965391/how-do-i-see-the-commit-differences-between-branches-in-git, posted Dec. 20, 2012, accessed on Aug. 4, 2015.*
Git Documentation, "git-log(1) Manual Page", http://git-scm.com/docs/git-log, from Internet Archive dated Oct. 30, 2013.*
Huynh, "Review: Git Clients for Mac—Tower vs SourceTree", http://www.sonnyhuynh/git-tower-vs-sourcetree, posted on Jun. 2, 2013, accessed on Aug. 4, 2015.*
Tower Help, "Displaying Commits", http://www.git-tower.com/help/mac/commit-history/display-commits, from Internet Archive dated Jul. 27, 2014.*
Tower Help, "Working Copy—Overview", http://www.git-tower.com/help/mac/working-copy/overview, from Internet Archive dated Aug. 8, 2014.*
Bird et al., The promises and Perils of Mining Git, Proceedings of the 2009 6th IEEE International Working Conference on Mining Software Repositories MSR '09, Washington, DC, 2009, pp. 1-10.*

* cited by examiner

*Primary Examiner* — Wei Zhen
*Assistant Examiner* — Timothy Duncan
(74) *Attorney, Agent, or Firm* — Van Pelt, Yi & James LLP

(57) ABSTRACT

A system for comparing code branches comprises a code branch separator for determining a first set of commits in a first code branch that are not common to a second code branch, and determining a second set of commits in the second code branch that are not common to the first code branch; and a user interface determiner for determining a display of the first set of commits and the second set of commits.

17 Claims, 10 Drawing Sheets

COMPARISON GRAPH

BACKGROUND OF THE INVENTION

A software development organization typically utilizes a version control system for maintaining its code through the process of development. A version control system tracks changes made to the code and allows changes to be undone if necessary. A version control system additionally allows a developer to check out a branch of the code for development without affecting the master code branch, and then to merge the checked out branch of the code back into the master code branch when changes to the checked out branch have been completed. Some software development organizations include a large number of developers, each working on their own checked out branch. It can be difficult for a developer to keep track of the changes happening to the main code repository while working on a checked out branch.

BRIEF DESCRIPTION OF THE DRAWINGS

Various embodiments of the invention are disclosed in the following detailed description and the accompanying drawings.

DETAILED DESCRIPTION

Figure 1:
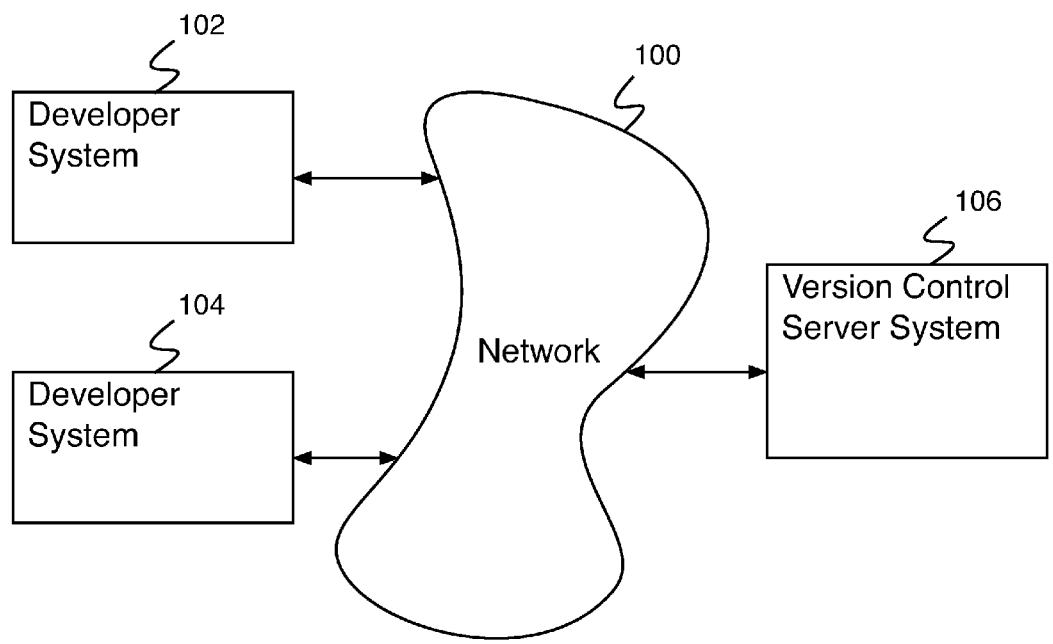
FIG. 1 is a block diagram illustrating an embodiment of a system for comparing code branches.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A comparison graph is disclosed. A system for comparing code branches comprises a code branch separator for determining a first set of commits in a first code branch that are not common to a second code branch, and determining a second set of commits in the second code branch that are not common to the first code branch; and a user interface determiner for determining a display of the first set of commits and the second set of commits.

In some embodiments, a comparison graph comprises a display representing a first set of commits in a first code branch and a second set of commits in a second code branch, wherein the first set of commits are not common to the second code branch and the second set of commits are not common to the first code branch. A version control system used by a software development organization comprises a code repository including many code branches. Some code stored in the code repository comprises a main code branch (e.g., a primary or master code branch verified to function correctly). In some embodiments, when a software developer wants to work on the code stored in the code repository, rather than directly editing the main code branch (e.g., the main code branch should always be known to be good, thus should not be edited directly), the software developer checks out a copy of the main code branch. This checked out copy of the main code branch begins identical to the main code branch. The software developer then edits the checked out code branch to make the desired changes. Each saved change to the checked out code branch comprises a commit. When the commits have been completed and verified as correct, the checked out code branch is merged into the main code branch, applying the commits to the main code branch. A software development organization can have a large number of software developers, each potentially working on one or more checked out code branches for different projects. As a software developer works on a first checked out code branch, it accumulates commits not present in the main code branch. In addition, as other software developers complete projects and merge other checked out code branches into the main code branch, the main code branch accumulates commits not present in the first checked out code branch. A software developer typically needs to be aware of the set of differences between the checked out code branch currently being worked on and the main code branch, in order to prevent or be aware of potential difficulties when merging the checked out code branch into the main code branch. In some embodiments (e.g., when working on a larger project), a software developer checks out a code branch from the main code branch (e.g., as a main branch of the project), and further checks out copies of the checked out code branch to work on. Other developers (e.g., developers working on other aspects of the same larger project) can also check out copies of the checked out code branch. The software developer is then interested in the differences between a checked out code branch and checked out versions of the checked out code branch. In various embodiments, a software developer is interested in differences between a main code branch and a checked out version of the main code branch, a checked out version of a main code branch and a checked out copy of that checked out version, a main code branch and checked out copy of a checked out version of the main code branch, two different checked out copies of a main code branch, or any other appropriate pair of code branches.

In some embodiments, the comparison graph displays a timeline of commits of two code branches, wherein only commits not present in both code branches are shown. In some embodiments, the comparison graph displays a first code line comprising a first set of commits, wherein the first set of commits comprises a first set of commits in a first code branch that are not common to a second code branch; and a second code line displaying a second set of commits, wherein the second set of commits comprises a second set of commits in a second code branch that are not common to the first code branch. In some embodiments, a symbol is shown on the code branch to indicate a type of commit (e.g., unmerged changes to a master code branch, a synced commit, an unsynced commit, an unsynced remote merge, an unsynced remote commit, etc.). In some embodiments, commits are shown using a non-linear time scale (e.g., a first spacing between commits is used for commits closer in time than a first threshold, a second spacing between commits is used for commits closer in time than a second threshold, a third spacing between commits is used for commits closer in time than a third threshold, etc.).

In some embodiments, the system for comparing code branches comprises a code branch separator for determining a first set of commits in a first code branch that are not common to a second code branch and determining a second set of commits that are not common to a first code branch. In some embodiments, when the system for comparing code branches requests commit data from a version control system, the version control system provides the code branch separator with a first set of commits comprising all commits in a first code branch and a second set of commits comprising all commits in a second code branch. The code branch separator then determines the sets of commits unique to each branch. In some embodiments, when the system for comparing code branches requests commit data from a version control system, the version control system provides the system for comparing code branches with the sets of commits unique to each branch. The system for comparing code branches additionally comprises a user interface determiner for determining a display of the first set of commits and the second set of commits.

In some embodiments, the system for comparing code branches is used to compare branches of documents other than code (e.g., written documents, computer-aided design files, image files, audio files, video files, etc.).

FIG. 1 is a block diagram illustrating an embodiment of a system for comparing code branches. In some embodiments, the network system of FIG. 1 provides communication between any appropriate number of software developers and a version control server system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, developer system 102 and developer system 104 comprise systems for use by a software developer while developing software. In various embodiments, developer system 102 and developer system 104 comprise systems for use by any appropriate content developer (e.g., a writer, a video editor, a computer-aided-designer, etc.). In various embodiments, there are 1, 6, 22, 122, 1059, or any other appropriate number of developer systems communicating with network 100. Version control server system 106 comprises a server system for providing version control. In various embodiments, version control server system 106 comprises maintaining copies of developer files (e.g., code), tracking versions of developer files, checking out and tracking developer copies of developer files, checking in developer files, merging developer files, providing copies of master or developer files, or any other appropriate version control function. In some embodiments, a project is maintained on version control server system 106 (e.g., the primary project database is stored on version control server system 106) and developer copies of project files are stored on a developer system (e.g., developer system 102 and developer system 104). In some embodiments, a project is maintained on a developer system (e.g., developer system 102 and developer system 104. In some embodiments, version control server system 106 comprises a system for comparing code branches. In some embodiments, a developer system (e.g., developer system 102 and developer system 104) comprises a system for comparing code branches.

Figure 2:
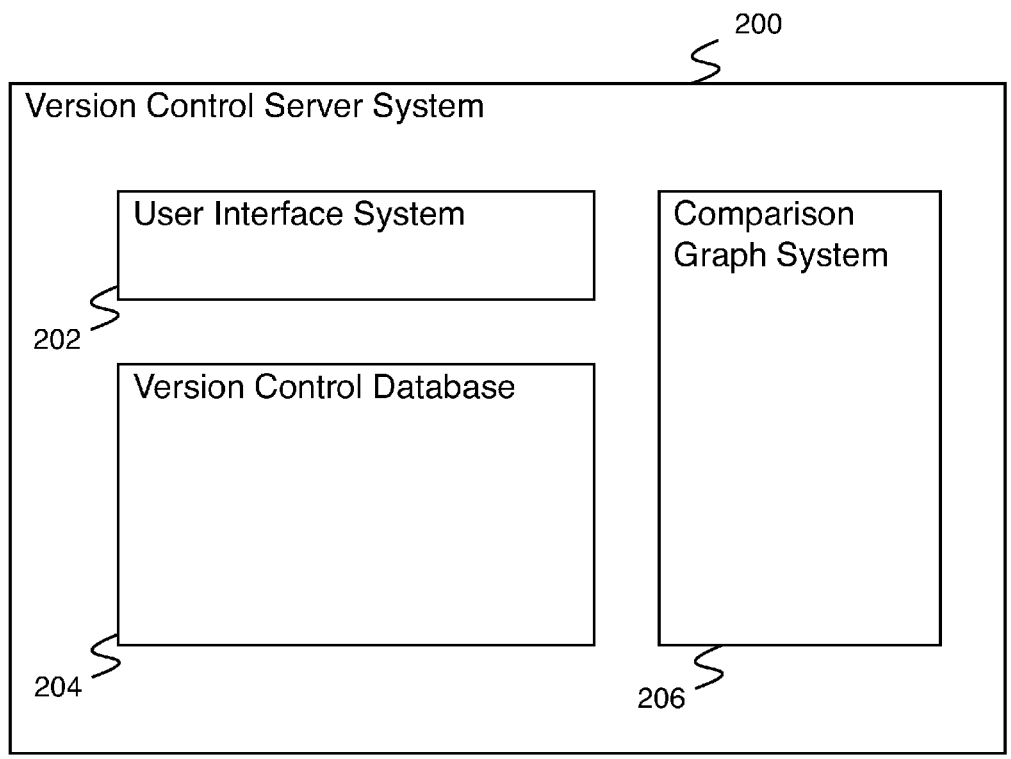
FIG. 2 is a block diagram illustrating an embodiment of a version control server system.

FIG. 2 is a block diagram illustrating an embodiment of a version control server system. In some embodiments, version control server system 200 comprises version control server system 106 of FIG. 1. In the example shown, version control server system comprises user interface system 202 for displaying a user interface. In some embodiments, user interface system 202 provides user interface display information. Version control server system 200 additionally comprises version control database 204. In various embodiments, version control database 204 maintains copies of developer files (e.g., code), tracks versions of developer files, checks out and tracks developer copies of developer files, checks in developer copies, merges in developer copies, provides developer copies or master copies, or performs any other appropriate version control function. In some embodiments, version control database 204 maintains a master code branch (e.g., a most recently updated and verified for production code branch). In some embodiments, version control database 204 maintains development code branches (e.g., code branches diverging from the master code branch for use in development). In some embodiments, one or more code branches are developed by a developer using a developer system (e.g., developer system 102 of FIG. 1 or developer system 104 of FIG. 1). In some embodiments, a developer using a developer system maintains a local copy of code branches stored by version control database 204. In some embodiments, a developer using a developer system edits a local copy of a code branch stored by version control database 204. In some embodiments, a developer using a developer system synchronizes changes made to a local copy of a code branch with the copy of the code branch stored by version control database 204. In some embodiments, a developer using a developer system synchronizes changes made to a code branch stored by version control database 204 with a local copy of the code branch. In some embodiments, a developer using a developer system merges changes to a development code branch stored by version control database 204 into a master code branch stored by version control database 204. Version control server system 200 additionally comprises comparison graph system 206. In some embodiments, comparison graph system 206 comprises a system for determining and providing a comparison graph. In some embodiments, comparison graph system 206 receives version control database information from version control database 204. In some embodiments, comparison graph system 206 receives developer system information from a developer system. In some embodiments, comparison graph system 206 determines comparison graph display information. In various embodiments, comparison graph system 206 provides comparison graph display information to a display system, to user interface system 202, to a developer system, or to any other appropriate system.

Figure 3:
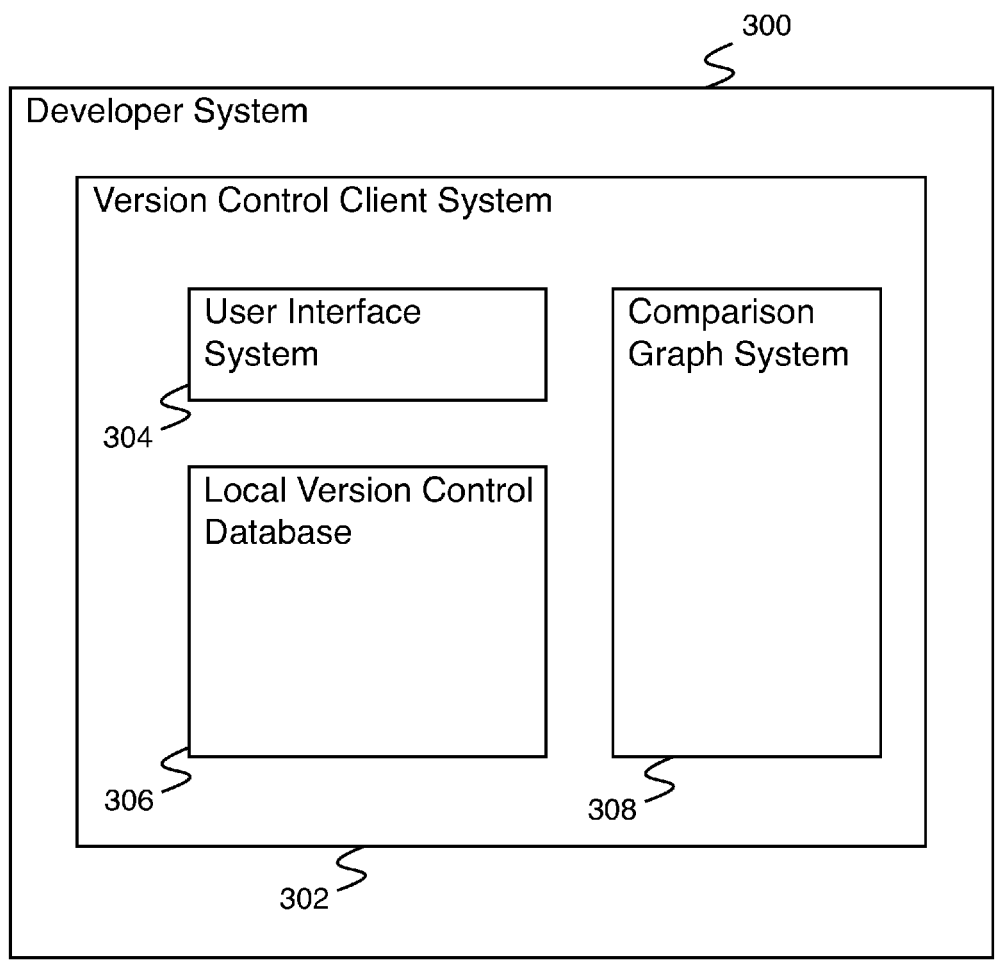
FIG. 3 is a block diagram illustrating an embodiment of a developer system.

FIG. 3 is a block diagram illustrating an embodiment of a developer system. In some embodiments, developer system 300 of FIG. 3 comprises developer system 102 of FIG. 1 or developer system 104 of FIG. 1. In the example shown, developer system 300 comprises version control client system 302. In various embodiments, version control client system 302 comprises a system for storing developer files, for interacting with a version control server system, for storing checked out copies of developer files from a version control server system, for tracking developer changes, or for performing any other appropriate developer system function. In the example shown, version control client system comprises user interface system 304 for displaying a user interface. In some embodiments, user interface system 304 provides user interface display information. Version control server client system 302 additionally comprises local version control database 306. In various embodiments, local version control database 306 maintains copies of developer files, tracks versions of developer files, stores checked out copies of developer files, interacts with a version control server system (e.g., version control server system 106 of FIG. 1), or performs any other appropriate version control function. In some embodiments, local version control database 306 comprises a local copy of a version control database (e.g., version control database 204 of FIG. 2). In some embodiments, local version control database 306 comprises a master code branch (e.g., a most recently updated and verified for production code branch). In some embodiments, local version control database 306 comprises development code branches (e.g., code branches diverging from the master code branch for use in development). In some embodiments, one or more code branches are edited by a developer using developer system 300. In some embodiments, a developer using a developer system synchronizes changes made to a local copy of a code branch with the copy of the code branch stored by the version control database. In some embodiments, a developer using a developer system synchronizes changes made to a code branch stored by the version control database with a local copy of the code branch. In some embodiments, a developer using a developer system merges changes to a development code branch stored by the version control database into a master code branch stored by the version control database. Version control client system 302 additionally comprises comparison graph system 308. In some embodiments, comparison graph system 308 comprises a system for determining and providing a comparison graph. In some embodiments, comparison graph system 308 receives version control database information from local version control database 306. In some embodiments, comparison graph system 308 receives version control system information from a version control server system. In some embodiments, comparison graph system 308 determines comparison graph display information. In various embodiments, comparison graph system 308 provides comparison graph display information to a display system, to user interface system 304, to another developer system, or to any other appropriate system.

Figure 4:
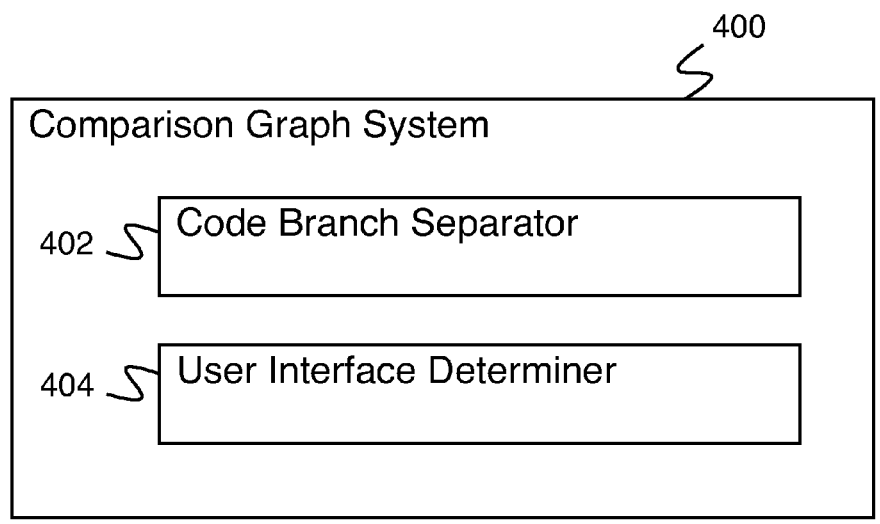
FIG. 4 is a block diagram illustrating an embodiment of a comparison graph system.

FIG. 4 is a block diagram illustrating an embodiment of a comparison graph system. In some embodiments, comparison graph system 400 comprises comparison graph system 206 of FIG. 2. In some embodiments, comparison graph system 400 comprises comparison graph system 308 of FIG. 3. In the example shown, comparison graph system 400 comprises code branch separator 402. In some embodiments, code branch separator 402 comprises a system for determining a first set of commits in a first code branch that are not common to a second code branch. In some embodiments, code branch separator 402 comprises a system for determining a second set of commits in the second code branch that are not common to the first code branch. In some embodiments, code branch separator 402 is implemented using a processor. Comparison graph system 400 additionally comprises user interface determiner 404. In some embodiments, user interface determiner comprises a user interface determiner for determining a display of the first set of commits and the second set of commits. In some embodiments, user interface determiner 404 is implemented using a processor. In some embodiments, code branch separator 402 and user interface determiner 404 are implemented using the same processor. In some embodiments, code branch separator 402 and user interface determiner 404 are implemented using different processors.

Figure 5:
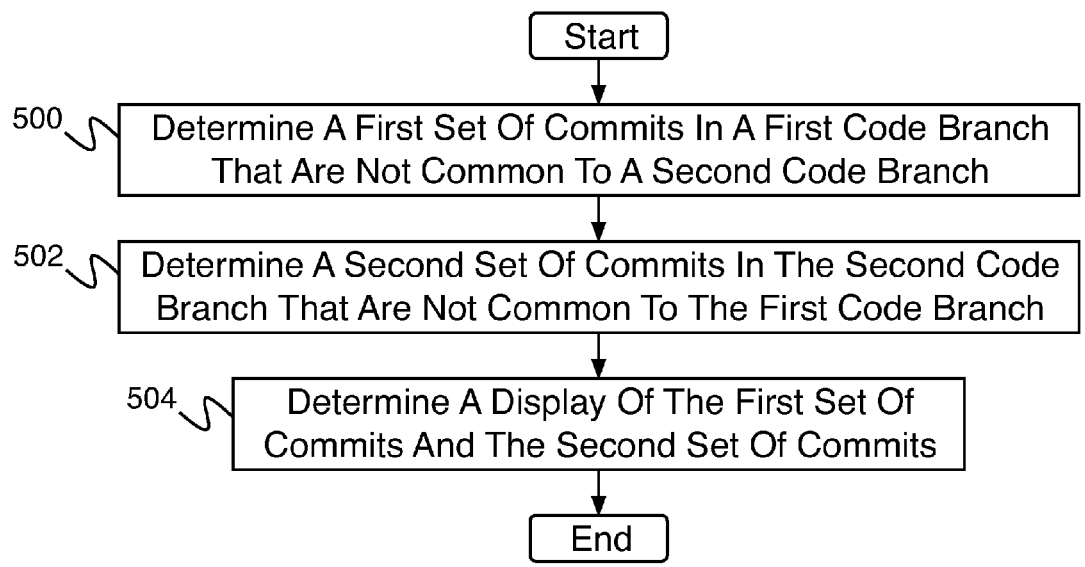
FIG. 5 is a flow diagram illustrating an embodiment of a process for comparing code branches.

FIG. 5 is a flow diagram illustrating an embodiment of a process for comparing code branches. In some embodiments, the process of FIG. 5 is executed by comparison graph system 400 of FIG. 4. In the example shown, in 500, a first set of commits in a first code branch that are not common to a second code branch are determined. In 502, a second set of commits in the second code branch that are not common to the first code branch are determined. In 504, a display of the first set of commits and the second set of commits is determined.

Figure 6A:
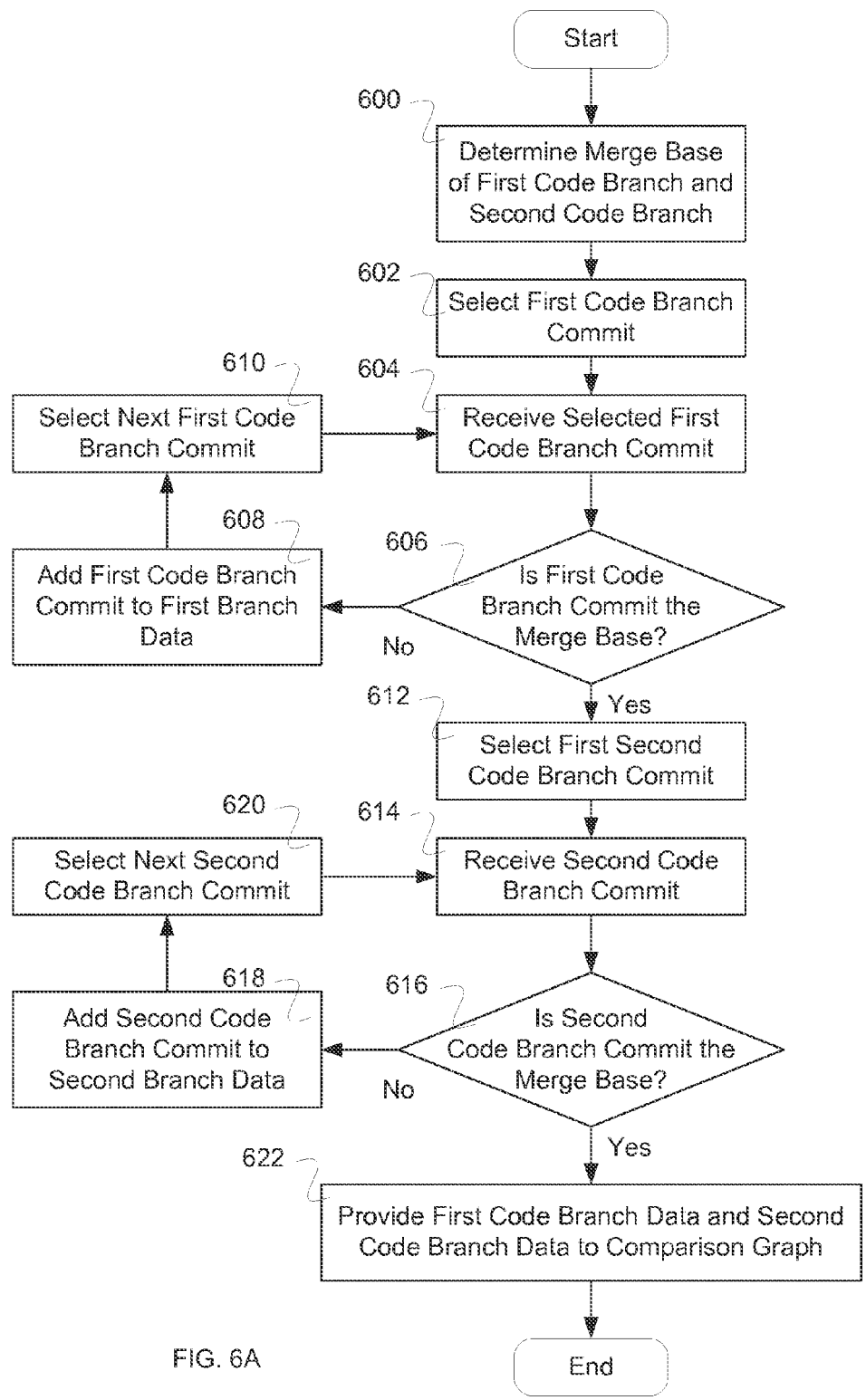
FIG. 6A is a flow diagram illustrating an embodiment of a process for determining a first set of commits in a first code branch that are not common to a second code branch and determining a second set of commits in the second code branch that are not common to the first code branch.

FIG. 6A is a flow diagram illustrating an embodiment of a process for determining a first set of commits in a first code branch that are not common to a second code branch and determining a second set of commits in the second code branch that are not common to the first code branch. In some embodiments, the process of FIG. 6A implements 500 and 502 of FIG. 5. In the example shown, in 600 a merge base of a first code branch and a second code branch is determined. In 602, a first code branch commit is selected. For example, data for the first code branch is received and a most recent first commit data is selected. In 604, the selected first code branch commit is received. In 606, it is determined whether the first code branch commit is the merge base. In the event that the first code branch commit is the merge base, control passes to 612. In the event that the first code branch commit is not the merge base, in 608 the first code branch commit is added to a first branch data. In some embodiments, the first code branch commit is not a commit also in the second code branch, so the first branch data comprises a first set of commits in a first code branch that are not common to a second code branch. In 610, a next first code branch commit is selected, and control passes to 604. In 612, a first second code branch commit is selected. In 614, the second code branch commit is received. In 616, it is determined whether the second code branch commit is the merge base. In the event that the second code branch commit is the merge base, control passes to 622. In the event that the second code branch commit is not the merge base, in 618 the second code branch commit is added to a second branch data. In some embodiments, the second code branch commit is not a commit also in the first code branch, so the second branch data comprises a second set of commits in a second code branch that are not common to a first code branch. In 620, a next second code branch commit is selected, and control passes to 614. In 622, the first code branch data and the second code branch data is provided to the comparison graph.

Figure 6B:
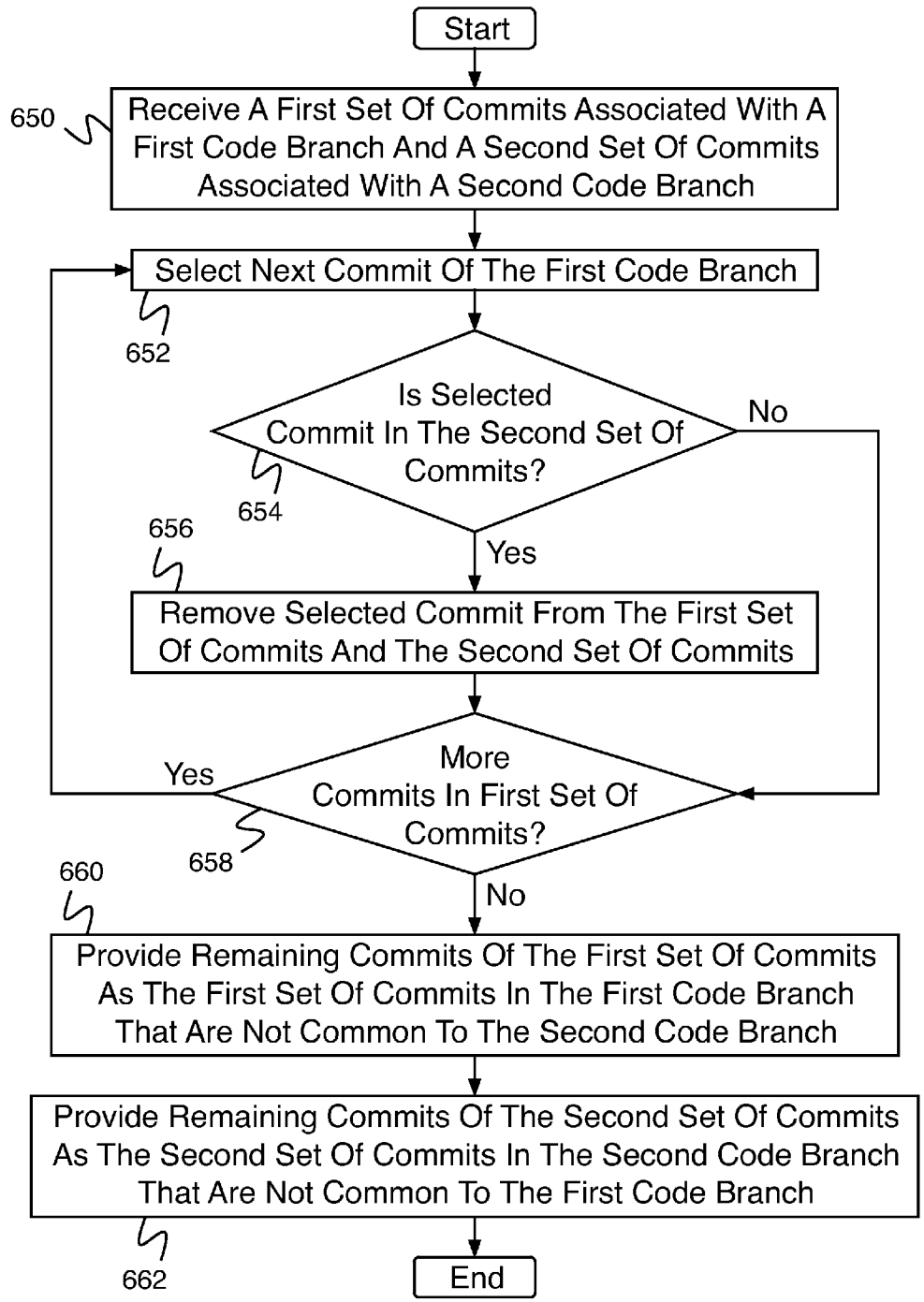
FIG. 6B is a flow diagram illustrating an embodiment of a process for determining a first set of commits in a first code branch that are not common to a second code branch and determining a second set of commits in the second code branch that are not common to the first code branch.

FIG. 6B is a flow diagram illustrating an embodiment of a process for determining a first set of commits in a first code branch that are not common to a second code branch and determining a second set of commits in the second code branch that are not common to the first code branch. In some embodiments, the process of FIG. 6B implements 500 and 502 of FIG. 5. In the example shown, in 650, a first set of commits associated with a first code branch and a second set of commits associated with a second code branch are received. In some embodiments, the first set of commits and the second set of commits are received from a version control database. In 652, the next commit of the first code branch is selected. In some embodiments, the next commit of the first code branch comprises the first commit of the first code branch. In 654, it is determined if the selected commit is in the second set of commits (e.g., if the selected commit is common to the first code branch and the second code branch). In the event the selected commit is not in the second set of commits, control passes to 658. In the event the second commit is in the second set of commits, control passes to 656. In 656, the selected commit is removed from the first set of commits and the second set of commits. In some embodiments, a commit in the first set of commits and in the second set of commits comprises a merge base and is indicated as such. In some embodiments, a server is requested to provide a merge base. In 658, it is determined whether there are more commits in the first set of commits. In the event there are more commits in the first set of commits, control passes to 652. In the event there are not more commits in the first set of commits, control passes to 660. In 660, the remaining commits of the first set of commits are provided as the first set of commits in the first code branch that are not common to the second code branch. In the 662, the remaining commits of the second set of commits are provided as the second set of commits in the second code branch that are not common to the first code branch.

Figure 7:
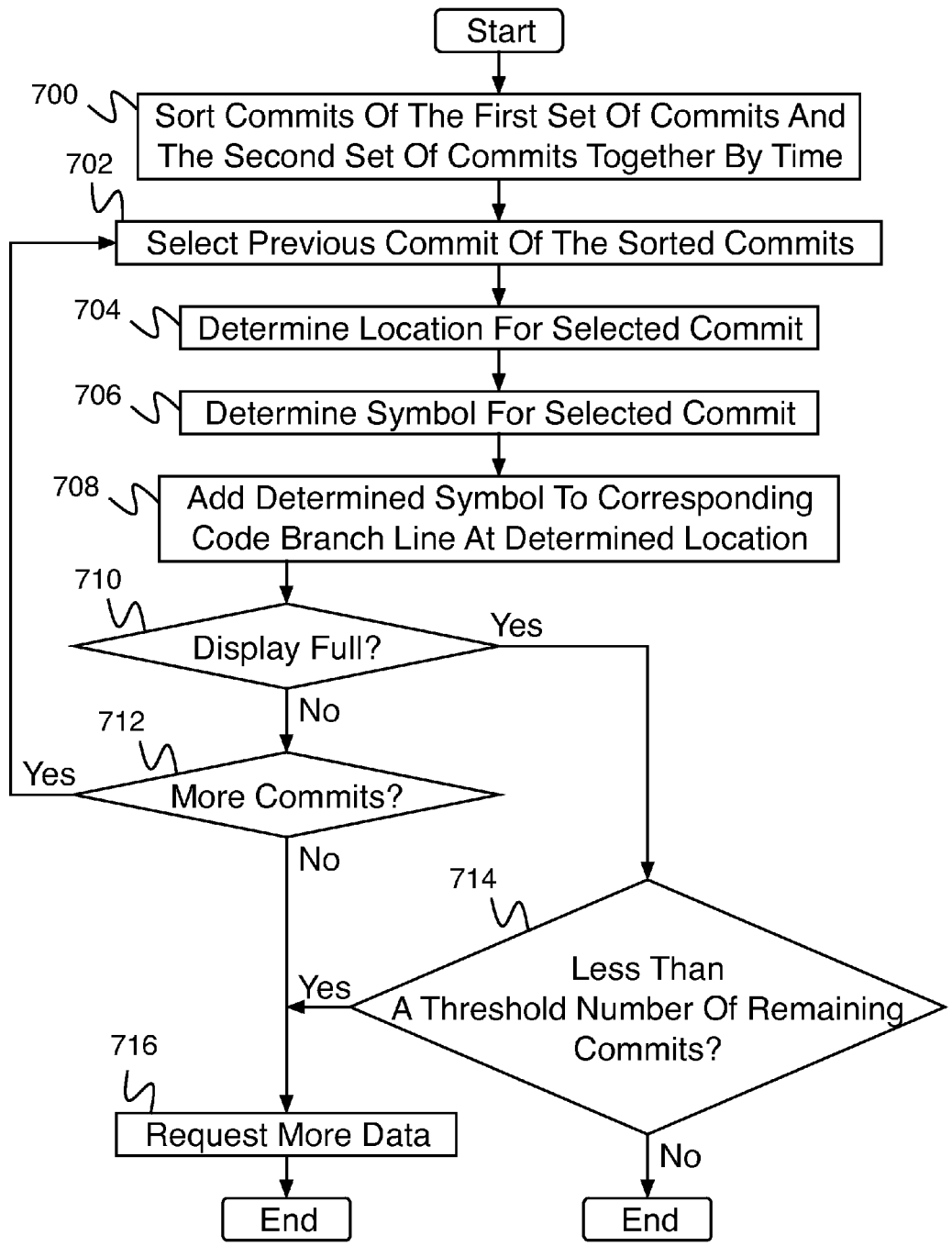
FIG. 7 is a flow diagram illustrating an embodiment of a process for determining a display of a first set of commits and a second set of commits.

FIG. 7 is a flow diagram illustrating an embodiment of a process for determining a display of a first set of commits and a second set of commits. In some embodiments, the process of FIG. 7 implements 504 of FIG. 5. In the example shown, in 700, the commits of the first set of commits and the second set of commits are sorted together by time (e.g., the commits of the first set of commits and the commits of the second set of commits are combined into a single list sorted by commit time). In 702, the previous commit of the sorted commits is selected. In some embodiments, the previous commit comprises the last commit (e.g., the most recent commit). In 704, a location for the selected commit is determined. In some embodiments, a location for the selected commit comprises a location relative to a next commit (e.g., the location for the selected commit is determined to be a distance from the next commit). In some embodiments, a location relative to a next commit is determined based at least in part on the time difference between the selected commit and the next commit. In 706, a symbol for the selected commit is determined. In some embodiments, a symbol for the selected commit is determined based at least in part on a commit type. In various embodiments, a commit type comprises unmerged changes to a master code branch, a synced commit, an unsynced commit, an unsynced remote merge, an unsynced remote commit, or any other appropriate commit type. In 708, the determined symbol is added to the corresponding code branch line at the determined location. In some embodiments, the corresponding code branch line is determined based at least in part on the set of commits associated with the selected commit (e.g., whether the selected commit was part of the first set of commits or the second set of commits). In some embodiments, the corresponding code branch line is determined to be either a first code branch line (e.g., corresponding to the first set of commits) or a second code branch line (e.g., corresponding to a second set of commits). In 710, it is determined whether the display is full (e.g., whether the set of symbols added to code branch lines occupies a full display). In the event it is determined that the display is full, control passes to 714. In the event it is determined that the display is not full, control passes to 712. In 712, it is determined whether there are more commits (e.g., more commits to add to code branch lines). In the event it is determined that there are more commits, control passes to 702. In the event it is determined that there are not more commits, control passes to 716. In 714 (e.g., in the event it is determined that the display is full in 710), it is determined whether there is less than a threshold number of remaining commits. In the event there is not less than a threshold number of remaining commits, the process ends. In the event there is less than a threshold number of remaining commits, control passes to 716. In 716, more data is requested.

Figure 8:
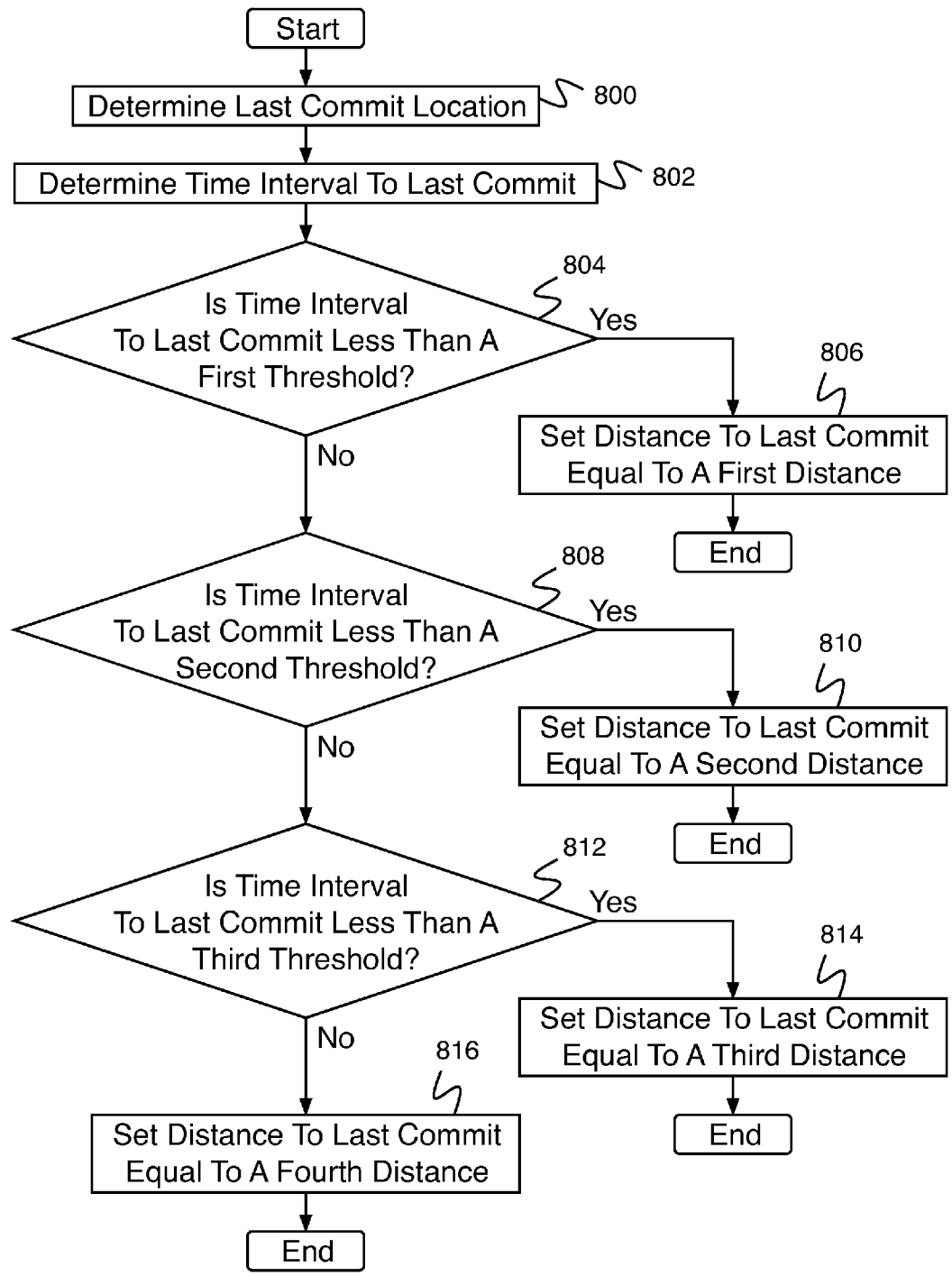
FIG. 8 is a flow diagram illustrating an embodiment of a process for determining a location for a commit.

FIG. 8 is a flow diagram illustrating an embodiment of a process for determining a location for a commit. In some embodiments, the process of FIG. 8 implements 704 of FIG. 7. In the example shown, in 800, a last commit location is determined. In some embodiments, a last commit location comprises a display location of the previously displayed commit. In 802, a time interval to the last commit is determined. In some embodiments, the time interval to the last commit comprises the difference in commit time between the last commit and the commit for which the location is being determined. In 804, it is determined whether the time interval to the last commit is less than a first threshold. In the event it is determined that the time interval to the last commit is not less than the first threshold, control passes to 808. In the event it is determined that the time interval to the last commit is less than the first threshold, control passes to 806. In 806, the distance to the last commit is set to a first distance. The process then ends. In 808, it is determined whether the time interval to the last commit is less than a second threshold. In the event it is determined that the time interval to the last commit is not less than the second threshold, control passes to 812. In the event it is determined that the time interval to the last commit is less than the second threshold, control passes to 810. In 810, the distance to the last commit is set to a second distance. The process then ends. In 812, it is determined whether the time interval to the last commit is less than a third threshold. In the event it is determined that the time interval to the last commit is not less than the third threshold, control passes to 816. In the event it is determined that the time interval to the last commit is less than the third threshold, control passes to 814. In 814, the distance to the last commit is set to a third distance. The process then ends. In 816, the distance to the last commit is set to a fourth distance.

Figure 9:
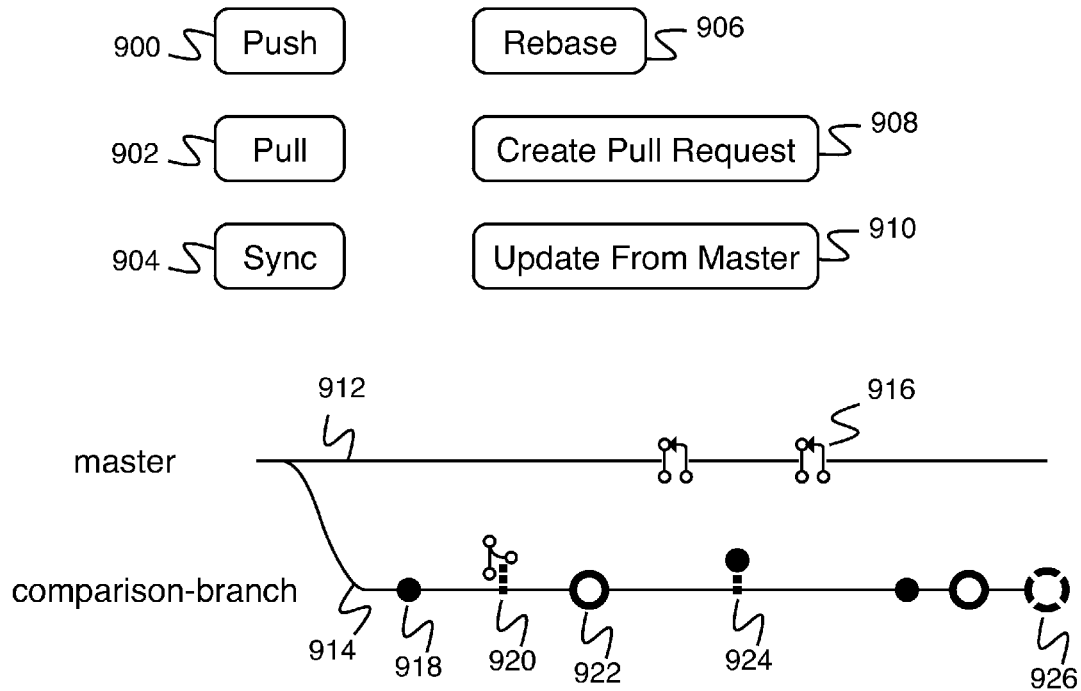
FIG. 9 is a diagram illustrating an embodiment of a comparison graph.

FIG. 9 is a diagram illustrating an embodiment of a comparison graph. In some embodiments, the comparison graph of FIG. 9 comprises a comparison graph determined by comparison graph system 400 of FIG. 4. In the example shown, the comparison graph of FIG. 9 comprises a set of buttons and an illustration of a set of changes. In the example shown, push button 900 comprises a button for issuing a push command. In some embodiments, a push command comprises a command to copy commits made on a local system (e.g., a developer system, e.g., developer system 102 of FIG. 1) to a server system (e.g., version control server system 106 of FIG. 1). Pull button 902 comprises a button for issuing a pull command. In some embodiments, a pull command comprises a command to copy commits made on a server system to the local system. Sync button 904 comprises a button for issuing a sync command. In some embodiments, a sync command comprises a push command and a pull command. Rebase button 906 comprises a button for issuing a rebase command. In some embodiments, a rebase command issues a rebase command to the local version control system, which removes any un-pushed local changes, pulls changes from the server system, and then reapplies the local changes, one by one, in order. Create pull request button 908 comprises a button for issuing a create pull request command. In some embodiments, a create pull request command requests other users look at and review changes pushed to a server system in order that they be reviewed or shared. Update from master button 910 comprises a button for issuing an update from master command. In some embodiments, an update from master command merges changes applied to a master branch into a comparison branch.

In the example shown, the comparison graph of FIG. 9 additionally comprises master code line 912 and comparison code line 914. In some embodiments, symbols displayed on master code line 912 and comparison code line 914 are spaced (e.g., in the horizontal direction) using the process of FIG. 8. Symbols applied to master code line 912 indicate changes made to a master code branch and not to a comparison code branch. Symbols applied to comparison code line 914 indicate changes made to a comparison code branch and not to a master code branch. In the example shown, unmerged changes symbol 916 indicates changes to the master code branch not merged into the comparison code branch. Synced commit symbol 918 indicates changes made on the local version of the comparison code branch and pushed to the remote version of the comparison code branch. Unsynced remote merge commit symbol 920 indicates a merge made by another user to the remote version of the comparison code branch that was not pulled to the local version of the comparison code branch. Unsynced commit symbol 922 indicates changes made to the local version of the comparison code branch but not pushed to the remote version of the comparison code branch. Unsynced remote commit symbol 924 indicates a commit made by another user to the remote version of the comparison code branch that was not pulled to the local version of the comparison code branch. Uncommitted changes symbol 926 indicates changes made to the local version of the comparison code branch that have not been committed.

In various embodiments, a user interface determiner is to provide an indicator for indicating a push command, a pull command, a sync command, a rebase command, a create pull request command, an update from master command, or any other appropriate indicator.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for comparing code branches, comprising:
a processor configured to:
determine a first set of commits in a first code branch that are not common to a second code branch; and
determine a second set of commits in the second code branch that are not common to the first code branch;
determine comparison graph display information of the first set of commits and the second set of commits, wherein the comparison graph display information comprises a first code branch line corresponding to the first set of commits and a second code branch line corresponding to the second set of commits;
categorize a commit in one of the first set of commits and the second set of commits based on the commit including:
changes in the first code branch not merged with the second code branch;
changes in a local copy of the second code branch not pushed to a remote version of the second code branch stored in a version control system;
changes in the second code branch made by another user not pulled to a local version of the second code branch; and
changes in a local copy of the second code branch not synced with a remote version of the second code branch;
select, for the commit, a location on one of the first code branch line or the second code branch line of the comparison graph display information;
select, for the commit, a symbol encoding information about the category of the commit; and
provide the comparison graph display information including the commit represented by the selected symbol at the selected location to be displayed; and
a memory coupled to the processor and configured to provide the processor with instructions.

2. The system of claim 1, wherein the first set of commits and the second set of commits are determined by providing a query to a version control system.

3. The system of claim 2, wherein the version control system provides the system for comparing code branches with a subset of the first set of commits and a subset of the second set of commits.

4. The system of claim 3, wherein a total number of commits provided by the version control system is up to a predetermined number of commits.

5. The system of claim 3, wherein in an event the system for comparing code branches requires more commits, another query is provided to the version control system.

6. The system of claim 1, wherein the first code branch line and the second code branch line is displayed as a timeline.

7. The system of claim 1, wherein the comparison graph display information of the second set of commits comprises the second code branch line displayed as a line branching off of the first code branch line.

8. The system of claim 6, wherein the timeline of the first set of commits and the second set of commits is displayed using a nonlinear time scale.

9. The system of claim 1, wherein the comparison graph information comprises an indicator for indicating a push command.

10. The system of claim 1, wherein the comparison graph information comprises an indicator for indicating a pull command.

11. The system of claim 1, wherein the comparison graph information comprises an indicator for indicating a sync command.

12. The system of claim 1, wherein the categorizing a commit is further based on the commit including changes in a local copy of the second code branch pushed to a remote version of the second code branch stored in a version control system.

13. The system of claim 1, wherein the comparison graph display information includes a graphical element on one of the first code branch line or the second code branch line representing that changes in a local version of the second code branch have not been committed.

14. The system of claim 1, wherein determining the comparison graph display information comprises determining a time interval between a commit and a previous commit on the first code branch line and the determining the location of the commit includes setting a distance between the commit and the previous commit on the first code branch line based on the time interval.

15. The system of claim 1, wherein the comparison graph information comprises an indicator for indicating an update from master command, the update from master command merging changes applied to the first code branch into the second code branch.

16. A method for comparing code branches, comprising:
   determining, using a processor, a first set of commits in a first code branch that are not common to a second code branch; and
   determining a second set of commits in the second code branch that are not common to the first code branch; and
   determining a comparison graph display information of the first set of commits and the second set of commits, wherein the comparison graph display information comprises a first code branch line corresponding to the first set of commits and a second code branch line corresponding to the second set of commits;
   categorizing a commit in one of the first set of commits and the second set of commits based on the commit including:
      changes in the first code branch not merged with the second code branch;
      changes in a local copy of the second code branch not pushed to a remote version of the second code branch stored in a version control system;
      changes in the second code branch made by another user not pulled to a local version of the second code branch; and
      changes in a local copy of the second code branch not synced with a remote version of the second code branch;
   selecting, for the commit, a location on one of the first code branch line or the second code branch line of the comparison graph;
   selecting, for the commit, a symbol encoding information about the category of the commit; and
   providing the comparison graph display information including the commit represented by the selected symbol at the selected location to be displayed.

17. A computer program product for comparing code branches, the computer program product being embodied in a non-transitory computer readable storage medium and comprising computer instructions for:
   determining, using a processor, a first set of commits in a first code branch that are not common to a second code branch; and
   determining a second set of commits in the second code branch that are not common to the first code branch; and
   determining a comparison graph display information of the first set of commits and the second set of commits, wherein the comparison graph display information comprises a first code branch line corresponding to the first set of commits and a second code branch line corresponding to the second set of commits;
   categorizing a commit in one of the first set of commits and the second set of commits based on the commit including:
      changes in the first code branch not merged with the second code branch;
      changes in a local copy of the second code branch not pushed to a remote version of the second code branch stored in a version control system;
      changes in the second code branch made by another user not pulled to a local version of the second code branch; and
      changes in a local copy of the second code branch not synced with a remote version of the second code branch;
   selecting, for the commit, a location on one of the first code branch line or the second code branch line of the comparison graph;
   selecting, for the commit, a symbol encoding information about the category of the commit; and
   providing the comparison graph display information including the commit represented by the selected symbol at the selected location to be displayed.

* * * * *